Feb. 14, 1939.  L. L. SALFISBERG  2,147,384
PACKAGE
Filed Oct. 5, 1937
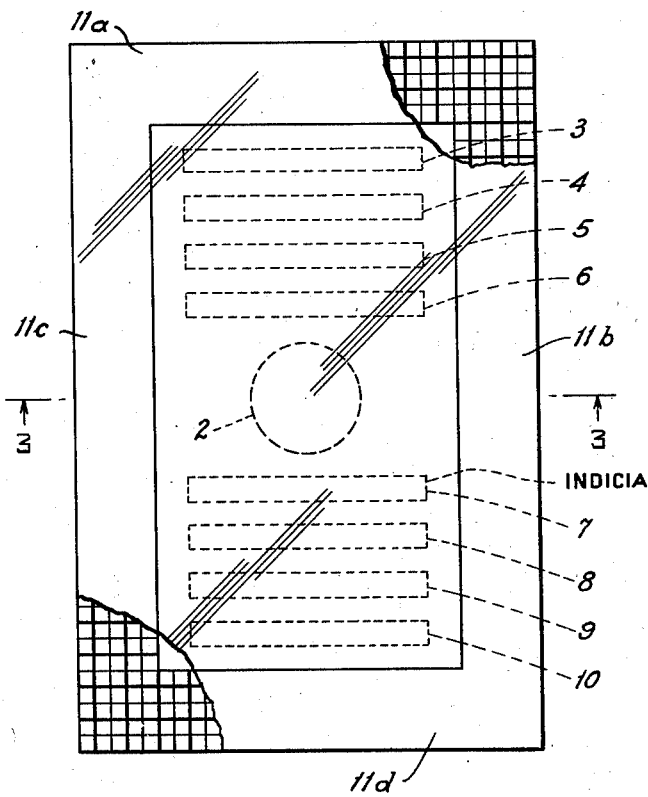
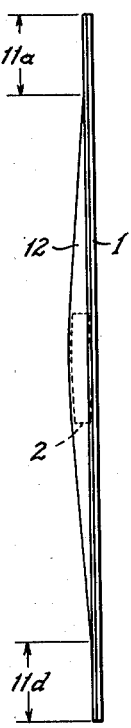
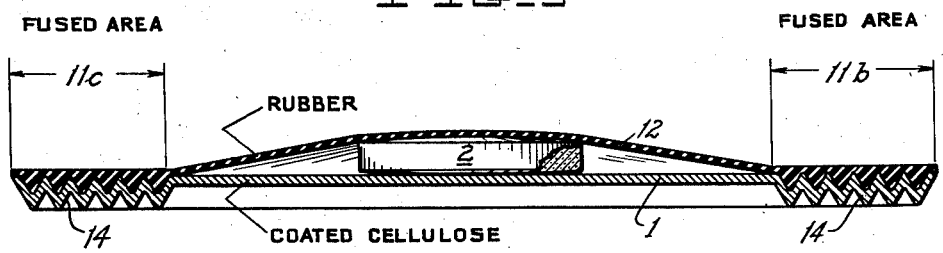
INVENTOR.
Leroy L. Salfisberg
BY Gordon B Scheivell
ATTORNEY.

Patented Feb. 14, 1939

2,147,384

UNITED STATES PATENT OFFICE 2,147,384

PACKAGE

Leroy L. Salfisberg, South Orange, N. J., assignor to Ivers-Lee Company, Newark, N. J., a corporation of Delaware Application October 5, 1937, Serial No. 167,356

1 Claim. (Cl. 206—46)

This invention pertains in general to package structures and specifically relates to a form of display package.

The principal object of the invention consists in providing a dispensing package composed of dissimilar layers of packaging material.

A further object of the invention comprises providing a dispensing package having a cellulose or like backing sheet and a transparent rubber or like covering membrane forming a hermetically sealed commodity container.

A still further object of the invention consists in producing a composite wrapping of a heat sealable membrane fused to a coated cellulose sheet.

These and other objects will be apparent from the following, reference being made to the accompanying drawing forming a part of this specification and in which:

Fig. 1 is a view of one embodiment of the package structure of the invention;

Fig. 2 is an edge view of the package depicted in Fig. 1; and

Fig. 3 is a sectional view taken along the line 3—3 of Fig. 1 showing the fabrication of the package structure of the invention.

The invention contemplates the provision of a composite package structure to conjointly utilize the characteristics of dissimilar packaging materials to form a utility dispensing container. According to the invention, a cellulose or like layer is united with a transparent rubber or like membrane to provide a display package. When desired, the cellulose sheet may be provided with indicia such as printed instructions et cetera, visible through the transparent covering membrane in juxtaposition with the contained commodity.

Referring to the drawing in detail, a layer of cellulose material 1 is provided at the back of the commodity 2. The commodity 2 may be of various types, but, as an example, it is here represented as a pharmaceutical tablet. The wall 1 preferably is composed of cellulose materials such as a masticated cellulose which is, as well known, opaque and capable of receiving printing impressions, the cellulose being hot pressed and preferably provided with a casein coating according to known processes. I have discovered that a casein coated cellulose is especially suitable for the fabrication of my invention.

The cellulose layer 1 is preferably provided with indicia in the form of rows of printing 3–10 disposed upon opposite sides of the commodity 2 as shown in Fig. 1. This printed matter may comprise instructions or advertisements relating to the tablet and is provided on spaces of the wall 1 adjacent the tablet 2.

In accordance with the invention, a relatively thin membrane of elastic heat sealing packaging material is provided to cover the tablet 2 and is attached along the edges of the layer 1 by means of fusing and crimping in a surrounding flange area 11. Preferably this membrane is composed of rubber, although other similar compositions may be employed. As shown in Fig. 3, the cellulose layer 1 is provided with corrugated deformations 14 in the sealing flanges. The membrane 12 is fused by heat and pressure in the corrugated areas of the sealing flange as represented in the areas 11b and 11c of the sealing flange in Fig. 3.

Due to the dissimilar characteristics of the layer 1 and membrane 12, the layer 1 will tend to maintain a normal planar formation while the membrane 12, as a result of its elasticity, will stretch over the commodity as shown in Fig. 3 and hold the commodity 2 in predetermined position. When desired, this result due to the dissimilar characteristics of the materials may be accentuated by increasing the stiffness of the layer 1 to any desired extent. The fused marginal sealing areas of the membrane 12 form an inseparable bond with the casein layer 1, thereby effecting a hermetically sealed sanitary container with a commodity permanently positioned with respect to the indicia by means of the elastic membrane. At the same time, the transparency of the membrane permits inspection of the commodity and of the accompanying indicia. The fused and corrugated sealing flanges provide a stiffened or embrittled structure which may be easily torn by the user to open the package structure and remove the contained commodity.

The opaque card 1 serves as a backing sheet and the thermoplastically connected edges of the backing sheet and the membrane 12 form a frame for accentuating the printed matter 3–10 and the commodity 2. The corrugated portions 14 of the backing sheet 1 stiffen the edge portions of the package and provide an ornamental frame effect for the printed matter and the commodity.

When the membrane 12 is made of thin elastic material thermoplastically applied to the card 1 as described, the elasticity of said membrane in conjunction with the relative stiffness of the card holds the membrane taut over the commodity and retains the commodity in predetermined position.

Although a preferred form of package has been disclosed, various equivalent forms as well as changes will occur to those skilled in the art but which will not depart from the intended scope of the invention. Therefore, no limitation is intended except as pointed out in the appended claim.

What is claimed as new and original to be secured by Letters Patent of the United States is:

A package comprising a relatively stiff opaque backing sheet of material capable of receiving printing impressions on the surface thereof, and a transparent facing membrane of thermoplastic elastic material stretched over and attached to the face of said backing sheet along the edge portions of said sheet and membrane so as to provide a commodity receiving space between said sheet and membrane within the connected edges thereof, the edge portions of said backing sheet being corrugated and the edge portions of said transparent membrane being fused into the corrugations of the backing sheet, whereby printed matter on said backing sheet and a commodity between said sheet and membrane are visible, said backing sheet forms a background for the commodity, the thermoplastically connected edges of the backing sheet and membrane form a frame for accentuating such printed matter and said commodity, and the elasticity of said membrane in conjunction with the relative stiffness of the sheet holds the membrane taut over the commodity in said space and thereby retains the commodity in a predetermined position.

LEROY L. SALFISBERG.